Patented Feb. 28, 1933

1,899,153

UNITED STATES PATENT OFFICE

WILLIAM R. JEAVONS, OF CLEVELAND HEIGHTS, AND MAHLON J. RENTSCHLER, OF WILLOUGHBY, OHIO

COMPOSITION FOR AND METHOD OF TREATING MOLTEN METALS

No Drawing. Application filed May 19, 1932. Serial No. 612,376.

This invention relates to the conditioning of barium monoxide (BaO) for use in the refining of molten metals; also to a process for refining molten metals by such conditioned barium monoxide.

It is well known that barium monoxide possesses valuable properties as a cleaner or scavenger for removing oxides, sulphides, silicates and other non-metallic impurities (commonly called sonims) from molten metals, but it has been found almost impossible to secure adequate contact between the barium monoxide and these sonims in metals having a high melting point, such as steel, due principally to the fact that the sonims constitute a very small proportion of the molten mass and are scattered through such mass; and, as the quantity of barium monoxide necessary to react with these sonims is usually very small (often less than one pound per ton) it is difficult to bring the individual particles of these non-metallic impurities and the reagent into reaction. This difficulty is further augmented by the high melting point of pure barium monoxide, about 4000° F.; and, while technical or impure barium monoxide has a much lower melting point, the presence of the impurities therein cripples the reactivity of the barium monoxide toward the sonims in the molten metal.

That the addition of small amounts of moisture to barium monoxide will produce compounds having low melting points has been indicated by others; but whether this lowering of the melting points is due to the formation or presence of anhydrous barium hydroxide, $Ba(OH)_2$, or to the formation of other compounds of barium and water, has not been known or indicated. We have found that a mass or batch of barium monoxide, when suitably conditioned by the addition of a measure of moisture which is determinate to a particular metal to be treated, is well adapted for removing impurities from such metal when in a molten condition. Our investigations have disclosed that the proportion of water added to the barium monoxide determines the melting point of the resultant mass and exerts a very decided effect upon the viscosity or fluidity of the melted barium compound. To illustrate: the addition of one percent of moisture to pure barium monoxide lowers its melting point to approximately 2500° F.; the addition of 7½ percent of moisture lowers its melting point to approximately 1500° F.; while the addition of approximately 12 percent of moisture will convert the barium monoxide into anhydrous barium hydroxide only, having a melting point of about 550° F. Apparently the addition of the moisture to the barium monoxide converts the latter, in accordance with the proportion of added moisture, into anhydrous barium hydroxide ($BaO(H_2O)$) or ($Ba(OH)_2$) and, for the purposes of our invention, no portion of the composition resulting from the treatment of the barium monoxide with moisture should be hydrated, or contain, water of hydration. Where barium monoxide has been conditioned with a small proportion of water and melted, the resulting mass is thick and viscid, while that conditioned with larger amounts of water yields very fluid masses which flow readily. The degree of viscosity or fluidity is important in many cases, because if the barium monoxide-water compound is too fluid, the separation of the slag from the molten metal is very difficult; while, on the other hand, if it is too thick or viscid, it cannot be distributed so as to properly contact the impurities in the metal, nor can it serve as a cover flux in a satisfactory manner for metals having low melting points, such as lead, brass, and tin. Where metals of such low melting points are to be treated, the proportion of water to the barium monoxide in the barium monoxide-water compound is so controlled that the compound melts below the melting point of the particular metal to be treated, so that at the moment when the metal has been melted it may be covered by the barium monoxide-water compound, which may in such case have been applied initially in a powdered form, thereby preventing the formation of an oxide scum as well as slagging any other impurities that may come to the surface of such metal.

The barium monoxide-water masses resulting from the treatment of barium monoxide with limited proportions of water and not containing water of hydration do not give off their water content at the melting temperatures of the masses (anhydrous barium hydroxide does not break down into barium oxide and water even at high temperatures); but when they are brought into contact with the impurities commonly found in molten metals, gas is liberated, and the batch of molten metal is agitated progressively as the masses decompose, thereby conducing to the better contacting of the reagent with the impurities. This action is without any explosive tendency and is of great importance in the treatment of metals having high melting points, as steel. Furthermore, as the total reaction which occurs in the decomposition of the barium monoxide-water mass is not an endothermic reaction, there is no objectionable cooling of the molten metal in the practice of our process.

For controlling the period of agitation of the fused metal, we have found it desirable to integrate the barium monoxide-water masses into compact units of such size as are most suitable for the kind and quantity of metal to be treated. This compacting may be done by compression, but we prefer to melt the masses and pour them into suitable containers of proper capacity to better protect them against atmospheric action. Inasmuch as the barium monoxide-water masses, when compacted, are poor conductors of heat, the interiors thereof cannot enter into reaction until the outer surfaces shall have melted; consequently water liberation can occur only progressively, and the duration of the agitation of the metal caused thereby can be controlled by varying the size of the compacted masses.

In preparing the barium monoxide-water masses, care must be taken to avoid the formation of water of hydration, as such water is likely to cause explosions in the molten metals. Suitable masses can be prepared by carefully uniting weighed definite quantities of barium monoxide and water. We have found, however, that very satisfactory barium monoxide-water masses for this purpose can be prepared by maintaining the barium monoxide at a temperature above that at which the hydrates of barium hydroxide break down and contacting it with such definite quantity of water in the form of steam as may be necessary to produce a mass of any desired melting point, thus avoiding the possibility of the formation of any water of crystallization in the mass. In the conditioning of barium monoxide, care should be taken to protect it from contact with $CO_2$, inasmuch as barium monoxide-water masses are very sensitive to $CO_2$ and are easily deteriorated thereby.

In carrying out our invention in connection with metals having high melting points, we prefer to prepare the barium monoxide-water mass by fusing it and casting it into blocks or otherwise forming it into units of such size that they can be readily introduced into a batch of molten metal. The size of the unit introduced determines the length of time which is required for the heat to penetrate it. While the outside of the lump or mass is melted off and brought into reaction with the impurities in the metal, this melting is relatively slow, due to the poor heat-conductivity of the lump or mass. At the same time, as the melted barium monoxide-water mass comes into contact with the non-metallic impurities, gas is liberated, as pointed out hereinbefore, and the metal bath agitated. The violence of the agitation depends upon the proportion of water used and the duration of the agitation depends upon the size of the fused lumps used. The following illustration of our invention is taken from actual practice:—

A heat of 110 tons of soft rimming steel was treated with 100 pounds of a barium monoxide-water mass made up as follows: 100 parts by weight of barium monoxide and one part by weight of water, produced as described hereinbefore, were fused and cast into iron containers of 25 pounds each. While the melted steel was tapped from the open-hearth furnace into the ladle, these 25-pound batches were thrown into the ladle at two-minute intervals. Owing to the fact that the specific gravity of the barium monoxide-water mass is only slightly lower than that of the molten steel, the containers were nearly submerged, extending to a considerable distance below the slag. As soon as the iron containers were melted away, it was noticed that the steel batch was kept in violent agitation, due to the gradual liberation of the water in a highly expanded condition throughout the entire period of tapping. There was no evidence of any explosion, but the melted steel was churned up violently and constantly throughout the tapping period and in this way brought into intimate contact with the residual barium monoxide. After the last can of barium monoxide-water mass was introduced into the molten metal, the latter was allowed to stand quiescent for fifteen minutes to permit the slag to rise to the top, after which the metal was poured into molds and rolled in the usual manner.

Reference has been made hereinbefore to the treatment of metals having high melting points by partly immersing integrate masses of barium monoxide-water compound therein. In order to obtain the reaction described hereinbefore, it is necessary, of course, that these masses shall penetrate the slag covering of such molten metal and contact with such metals at and below the surface thereof. Furthermore, in the treatment of metals having low melting points, it may be desirable to remove impurities therefrom by the use of barium monoxide-water compounds in substantially the same manner as indicated for the treatment of metals having high melting points. However, in metals having such low melting points, it is usually sufficient to give them the surface treatment referred to hereinbefore, such surface treatment serving, if applied at the time when the metal or metals are melted, to prevent the formation of scum impurities on the surface thereof as well as to remove any impurities which may arise to the surface.

To summarize, we prepare a composition of matter from barium monoxide and water in such proportions that, when the composition is used for the refining of metal, the amount of gas liberated is enough to give the metal batch adequate agitation, and we control the time of agitation by regulating the size of the units introduced into the melted metal at any one time.

This application is a continuation in part of our application No. 535,568, filed May 6, 1931.

Having thus described our invention, what we claim is:—

1. A composition for the treatment of molten metals for removing impurities therefrom, said composition consisting of barium monoxide having distributed therethrough and combined therewith a predetremined proportion of water insufficient to convert all the said barium monoxide into anhydrous barium hydroxide and substantially free from water of hydration.

2. The process of refining a molten metal which consists in subjecting the same to barium monoxide which has been conditioned by the incorporation therewith of a predetermined amount of water, less than enough to convert all the barium monoxide into anhydrous barium hydroxide such that the fusing point of the compound thus produced is lower than the temperature of the molten metal to be treated.

3. The process of treating a molten metal which consists in introducing beneath the surface thereof one or more integrate masses each consisting of barium monoxide which has been conditioned by a predetermined amount of water, less than 11.8 percent by weight of the barium monoxide whereby the melting point of the compound thus produced is lower than the temperature of the molten metal.

4. The process of treating a molten metal which consists in conditioning barium monoxide with a predetermined amount of water or moisture to form a composition having a melting point lower than the temperature of the molten metal, fusing the compound thus produced, and introducing the same into containers capable of being removed by the molten metal thus treated and applying the containers to the molten metal.

5. The process of purifying a molten metal which consists in introducing beneath the surface thereof barium monoxide which has been conditioned by the addition thereto of a predetermined amount of water, less than enough to convert all the barium into anhydrous barium hydroxide and in such quantity that the fusing point of the compound is lower than the temperature of the molten metal, agitating the molten metal and removing impurities therein by the decomposition of the compound, and continuing the reaction between said impurities and said compound beyond the period of agitation.

6. An integrated mass for the treatment of molten metal comprising a mixture of barium oxide (BaO) and anhydrous barium hydroxide $(Ba(OH)_2)$, the latter being present in the proportion of from 1% to 95%.

7. The process of treating molten metal which comprises introducing thereinto a mixture of barium oxide (BaO) and anhydrous barium hydroxide in such relative proportions that the melting point of the mixture is below the temperature of the molten metal.

In testimony whereof, we hereunto affix our signatures.

WILLIAM R. JEAVONS.
MAHLON J. RENTSCHLER.